US009872136B2

(12) United States Patent
Bar-Shalom et al.

(10) Patent No.: US 9,872,136 B2
(45) Date of Patent: Jan. 16, 2018

(54) METHOD AND APPARATUS FOR TRANSMITTER GEO-LOCATION IN MOBILE PLATFORMS

(71) Applicant: Intel IP Corporation, Santa Clara, CA (US)

(72) Inventors: Ofer Bar-Shalom, Kiryat Ono (IL); Assaf Kasher, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/754,683

(22) Filed: Jun. 29, 2015

(65) Prior Publication Data

US 2016/0381498 A1    Dec. 29, 2016

(51) Int. Cl.
*H04W 4/02* (2009.01)
*G01S 3/74* (2006.01)
*G01S 3/46* (2006.01)
*G01S 3/72* (2006.01)

(52) U.S. Cl.
CPC ............... *H04W 4/02* (2013.01); *G01S 3/46* (2013.01); *G01S 3/72* (2013.01); *G01S 3/74* (2013.01)

(58) Field of Classification Search
CPC ...... H04B 7/0404; H04B 7/0413; H04B 7/08; G01S 5/0273; G01S 5/0284; G01S 3/46; G01S 3/72; G01S 3/74; H04W 4/02; H04W 64/00
USPC ...... 455/13.3, 19, 25, 82–83, 121, 129, 274, 455/279.1, 456.1–457, 562.1, 575.7
See application file for complete search history.

(56) References Cited

U.S. PATENT DOCUMENTS

| 4,578,678 | A  | * | 3/1986  | Hurd    | G01S 19/29  |
|           |    |   |         |         | 342/357.25  |
| 6,615,024 | B1 | * | 9/2003  | Boros   | H01Q 1/246  |
|           |    |   |         |         | 455/562.1   |
| 7,477,192 | B1 |   | 1/2009  | Haff et al. |         |
| 8,577,305 | B1 | * | 11/2013 | Rossi   | H04B 7/0413 |
|           |    |   |         |         | 327/115     |
| 2004/0072579 | A1 | * | 4/2004  | Hottinen | G01S 3/40 |
|           |    |   |         |         | 455/456.1   |
| 2005/0227619 | A1 | * | 10/2005 | Lee     | H04B 7/2606 |
|           |    |   |         |         | 455/22      |
| 2005/0239506 | A1 | * | 10/2005 | Li      | H01Q 3/267  |
|           |    |   |         |         | 455/561     |
| 2008/0012710 | A1 | * | 1/2008  | Sadr    | G06K 7/0008 |
|           |    |   |         |         | 340/572.1   |
| 2010/0099370 | A1 | * | 4/2010  | Nichols | H01Q 1/3275 |
|           |    |   |         |         | 455/129     |

(Continued)

OTHER PUBLICATIONS

Extended European Search Report received for European Patent Application No. 16171423.3, dated Oct. 31, 2016, 14 pages.

(Continued)

*Primary Examiner* — Michael Mapa
(74) *Attorney, Agent, or Firm* — Schiff Hardin LLP

(57) ABSTRACT

Described herein are architectures, platforms and methods for implementing a direct estimation of a transmitter's position based upon raw radio frequency (RF) signals that are received by a portable device. A mathematical operation such as a maximum-likelihood estimation (MLE) algorithm, which utilizes collected snapshots from the received raw RF signals as variables, is implemented to perform direct estimation.

20 Claims, 3 Drawing Sheets

(56) References Cited

U.S. PATENT DOCUMENTS

| | | | | |
|---|---|---|---|---|
| 2011/0201297 A1* | 8/2011 | Adler | ............ | H04B 7/0822 |
| | | | | 455/334 |
| 2013/0169471 A1* | 7/2013 | Lynch | ............ | G01S 7/352 |
| | | | | 342/107 |
| 2013/0207842 A1* | 8/2013 | Small | ............ | H01Q 3/005 |
| | | | | 342/372 |
| 2013/0301454 A1* | 11/2013 | Seol | ............ | H04B 7/043 |
| | | | | 370/252 |
| 2014/0323073 A1* | 10/2014 | Richards | ............ | H04B 7/12 |
| | | | | 455/208 |
| 2015/0124693 A1* | 5/2015 | Ahn | ............ | H04B 7/15564 |
| | | | | 370/315 |

OTHER PUBLICATIONS

Huang et al., "Wideband AoA Estimation and Beamforming With Hybrid Antenna Array", Global Telecommunications Conference (Globecom 2011), IEEE, Dec. 5, 2011, 6 pages.

Stoica et al., "Maximum Likelihood Methods for Direction-of-Arrival Estimation", IEEE Transactions On Acoustics, Speech and Signal Processing. vol. 38, No. 7, Jul. 1990, pp. 1132-1143.

* cited by examiner

METHOD AND APPARATUS FOR TRANSMITTER GEO-LOCATION IN MOBILE PLATFORMS

BACKGROUND

An increasing number of wireless communication standards as applied to a portable device and a trend towards ever smaller, slimmer and lighter portable devices may cause design challenges for antennas or antennae (hereinafter referred to as antennas in this document). Antennas represent a category of components that may fundamentally differ from other components in the portable device. For example, the antenna may be configured to efficiently radiate in free space, whereas the other components are more or less isolated from their surroundings.

Antennas operating at millimeter wave (mm-wave) frequencies—for high data rate short range links—are expected to gain popularity. One example of such system is called wireless WiGig, which operates at 60 GHz frequency band and utilizes a waveguide structure for transmission or reception of radio frequency (RF) signals at this operating frequency. Current antenna designs to estimate a wireless transmitter position may require inefficient use of multiple analog-to-digital (A/D) samplers in all antenna channels of an antenna array (i.e., one A/D sampler per antenna channel). As such, there is a need to improve estimation accuracy, especially when weaker transmission signals are involved during transmitter position estimation.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for a direct estimation of a transmitter's position based upon raw radio frequency (RF) signals that are received by a portable device. For example, the direct estimation may be based upon the raw RF signals received by at least one antenna array within the portable device platform. In this example, a mathematical operation such as a maximum-likelihood estimation (MLE) algorithm, which utilizes collected snapshots from the received raw RF signals as variables, is implemented to perform the direct estimation. In such a case, a typical requirement of initially estimating and using an angle-of-arrival (AOA) as a basis for a subsequent estimation of the transmitter position is bypassed.

As an example implementation described herein, the RF signals are received through antenna(s) or elements of different antenna arrays within a portable device platform. For each antenna in the antenna array, the received RF signal is phase shifted. For example, the phase shifting is taken from a row of a Hadamard matrix.

With the phase shifted received RF signals at each antenna of the antenna arrays, a combination step is implemented to gather and combine the phase shifted received RF signals into one received RF signal. The received RF signal is thereafter converted into a baseband signal output and the baseband signal output is transformed into digital baseband signal by a single A/D converter per antenna array.

Subsequently therein, snapshots of the digital baseband signal from each antenna array are taken and the multiple snapshots for all antenna arrays are gathered to obtain "N" snapshots. As described herein, the MLE algorithm utilizes the "N" snapshots to generate a final transmitter position.

Figure 1:
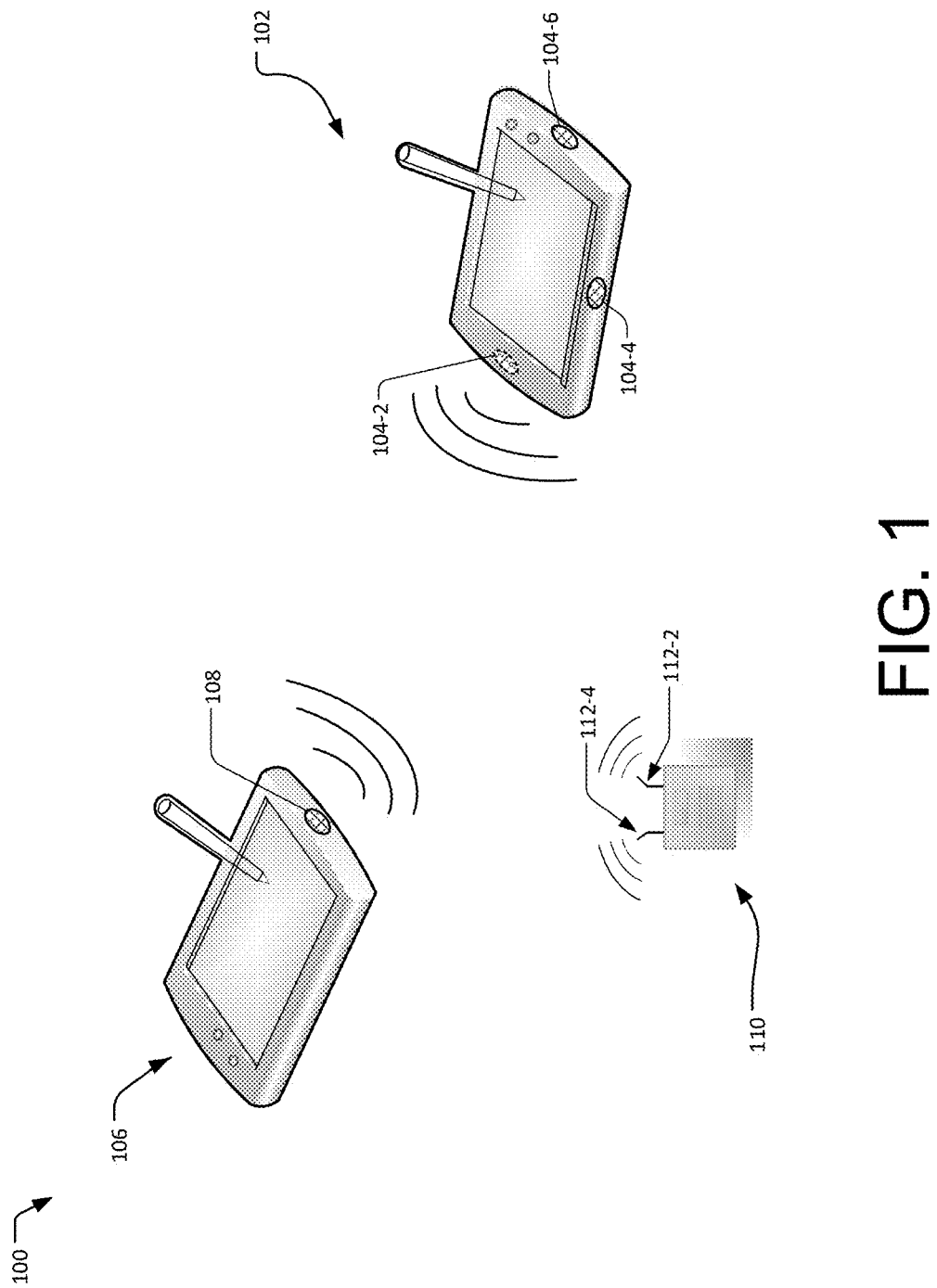
FIG. 1 is an example arrangement of millimeter-wave (mm-wave) portable devices during a mm-wave wireless communications as described in present implementations herein.

FIG. 1 is an example arrangement 100 of portable devices as described in present implementations herein. The portable devices, for example, may utilize antenna arrays with mm-wave waveguide structures to implement a line-of-sight (LOS) wireless communication at WiGig frequency band (i.e., 60 GHz). In this example, the antenna arrays may be utilized further to facilitate position estimation (e.g., azimuth and/or elevation) of a transmitting antenna or device.

As shown, the arrangement 100 illustrates a portable device 102 with multiple antenna arrays 104-2, 104-4 and 104-6; and another portable device 106 with a single antenna array 108. The arrangement 100 further illustrates an access point (AP) 110 with antenna arrays 112-2 and 112-4.

The portable device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The portable device 102 or 104 is considered as a mm-wave portable device due to its feature or capability to operate at WiGig operating frequencies. The portable device 102, for example, utilizes the antenna array 104-2 in a LOS wireless communication with the other portable device 106 or the AP 110. In another example, the portable device 102 utilizes the antenna arrays 104-2 and 104-4 in receiving RF signals from the AP 110. In these examples, each antenna array 104 may be located at an open-end of the mm-wave waveguide structure.

As described herein, the antenna arrays 104 are of known orientation to the portable device 102. For example, the antenna array 104-2 is optimally disposed on at least one edge and of a certain distance (i.e., equal or less than half wavelength) with respect to the other antenna array 104-4 within the portable device platform. In this example, the known orientation of the antenna arrays 104 may be utilized in the mathematical operation during the direct estimation of a transmitter position such as the position of the transmitting AP 110 or portable device 106.

For example, the portable device 102 detects and receives RF signals from the AP 110 and/or the portable device 106. In this example, the orientation of the antenna arrays 104 may be picked up by a gyro sensor (not shown) within the portable device 102 and the orientation is utilized as a reference variable in the mathematical operation to calculate and distinguish the estimated position of the transmitting AP 110 and/or the portable device 106.

Although the example arrangement 100 illustrates in a limited manner basic components of mm-wave wireless communications between the portable devices 102 and 106, other components such as battery, one or more processors, SIM card, etc. were not described in order to simplify the embodiments described herein.

Figure 2:
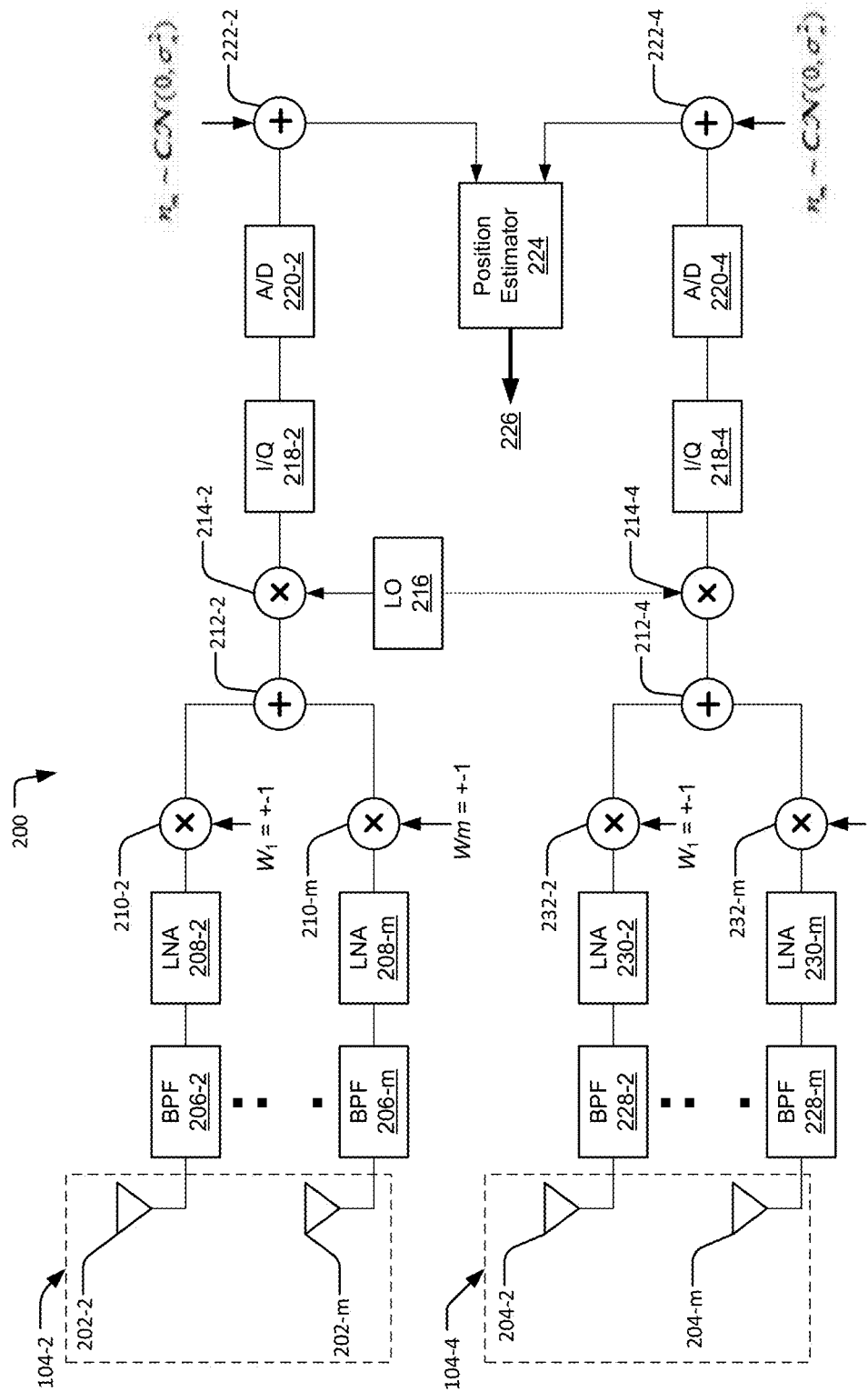
FIG. 2 is an example receiver circuitry configured to implement direct estimation of a particular transmitter position as described in present implementations herein.

FIG. 2 illustrates an example receiver circuitry 200 that is configured to implement direct estimation of a particular transmitter position. The receiver circuitry 200, for example, forms part of the portable device 102 platform and configured to estimate the position of the transmitting AP 110. In this example, the transmitting AP 110 transmits the RF signals that are received by the portable device 102.

As a general overview of FIG. 2, the RF signals, for example, are received through a first antenna array 104-2; phase shifted using Hadamard matrix principle; down-converted into baseband signals; and converted into digital baseband signals with the use of a single A/D converter per antenna array. Thereafter, a mathematical operation is performed to obtain a model of the received RF signal, which includes a first set of "n" snapshots of the received digital baseband signals in the first antenna array 104-2.

A similar operation (as discussed in the foregoing) is performed for the RF signals received through the second antenna array 104-4 to obtain a second set of "n" snapshots, which is the model of the received digital baseband signals through the second antenna array 104-4. After gathering all of the obtained "n" snapshots from each antenna arrays 104 to obtain a total "N" snapshots, a mathematical operation such as the MLE algorithm is performed to calculate the estimated position of the transmitting AP 110.

With continuing reference to FIG. 2, the receiver circuitry 200 includes a separate signal processing operation for the first antenna array 104-2, and the second antenna array 104-4. For purposes of illustration, the RF signals from the transmitting AP 110 are assumed to be received, but not limited to, by the antenna arrays 104-2 and 104-4. Based from the received RF signals, the mathematical operations described herein may directly facilitate the estimated position (e.g., horizontal (x), vertical (y), and/or angular (z) orientations) of the transmitting AP 110.

For the antenna array 104-2, the RF signals may be detected and received through antennas 202-2, 202-4, . . . 202-$m$ where "m" may denote the number of elements or antenna in the antenna array 104-2. With the received RF signals at each of the antennas 202-2, 202-4, . . . 202-$m$, band pass filters (BPFs) 204 and low-noise amplifiers (LNAs) 206 may filter and amplify, respectively, the received RF signals for each antennas 202-2, 202-4 . . . 202-$m$. Thereafter, each amplified (and filtered) RF signal from the corresponding LNAs 206 is phase shifted by a phase-shifter component 208, which combines the amplified RF signal from each LNA 206 with a phase-shifting or weighting vector 210 to generate phase-shifted (amplified) RF signal.

As described herein, the phase-shifting or weighting vector 210 may include Hadamard matrix entries (i.e., +−1) defined as:

$$H_2 \triangleq \begin{bmatrix} 1 & 1 \\ 1 & -1 \end{bmatrix}$$

$$H_{2^k} \triangleq \begin{bmatrix} H_{2^{k-1}} & H_{2^{k-1}} \\ H_{2^{k-1}} & -H_{2^{k-1}} \end{bmatrix}$$

$$= H_2 \otimes H_{2^{k-1}}, \forall\, 2 \leq k \in \mathbb{N}$$

$$w_{l,m} \triangleq e_m^T H_{2^k}$$

where "$W_{l,m}$" variable is the phase-shifting or weighting vector 210; the "$\otimes$" denotes Kronecker matrix product; and "$e_m$" variable is a M×1 vector whose mth entry is 1 and its remaining entries are 0s.

With the phase shifted RF signal output from each phase-shifting or weighting vector 210, a first combiner component 212-2 is configured to combine all phase shifted RF signal outputs from the "m" elements/branch (i.e., antennas 202-2, 202-4, . . . 202-$m$) of the first antenna array 104-2 to generate a combined phase shifted RF signal output. Thereafter, the combined phase shifted RF signal output is down-converted by a converter component 214 into baseband signals. For example, the converter component 214 is configured to mix the combined phase shifted RF signal output from the first combiner component 212-2 with a down-converting signal from a local oscillator (LO) 216.

In an implementation, the LO 216 that supplies the down-converting signal to the converter component 214-2 may be different from the LO that supplies another down-converting signal to another converter component 214-4 as shown by dotted lines. In such a case, the antenna arrays 104-2 and 104-4 as described herein may not necessarily be synchronized to perform the direct estimation of the transmitter position. Furthermore, the direct estimation of the transmitter position may be implemented by a single antenna array such as the antenna array 104-2 or antenna array 104-4.

After obtaining the baseband signal output from the converter component 214, a magnitude-phase (I/Q) component 218-2 is configured to process in-phase (I) and quadrature (Q) components of the baseband signal before converting the I/Q components into digital baseband signals. For example, a single A/D converter component 220. (i.e., per antenna array) is configured to convert the analog I/Q baseband signal into digital I/Q baseband signals.

As described in present implementations herein, a second combiner component 222-2 may be configured to generate a model of the RF signals received through the antenna array 104-2. The model may include, for example, a first set of "n" snapshots of the received RF signal from the first antenna array 104-2. In this example, it is assumed that complex gain of channel paths remains constant and does not change between snapshots.

Concatenating all training field samples into a vector, an nth snapshot may be defined as:

$$W_l \triangleq \begin{bmatrix} w_{l,1}^T \\ w_{l,2}^T \\ \vdots \\ w_{l,M}^T \end{bmatrix}, y_{l,n} \triangleq \begin{bmatrix} y_{l,1}[n] \\ y_{l,2}[n] \\ \vdots \\ y_{l,M}[n] \end{bmatrix}, n_{l,n} \triangleq \begin{bmatrix} n_{l,1}[n] \\ n_{l,2}[n] \\ \vdots \\ n_{l,M}[n] \end{bmatrix}$$

where the variables "$W_l$" is a phase-shift/weighting vector for all possible phase shifts; variable "$y_{l,m}$" is a model of the received signal for all antenna/elements of the antenna array; and the variable "$H_{l,n}$" is additive Gaussian noise.

In another form such as in matrix form, the nth antenna array snapshot is given by:

$$y_{l,n} = W_l a_l(p) \beta_l + n_{l,n} \qquad \text{Eq. 1}$$

where the variable "$a_l(p)$" is a receiving array steering vector with function "p" (i.e., position); and the variable "$\beta_l$" is an unknown complex gain associated with a first channel tap that is observed by the "l" th array. In this case, since the antenna arrays are co-located, the complex attenuation coefficients are assumed to be correlated.

The operation and/or process described above for the antenna array 104-2 may be implemented similarly to the second antenna array 104-4. As shown, the RF signals received through the second antenna array 104-4 may undergo processing at BPFs 228, LNAs 230, phase shifting components 232, a first combiner 212-4, a converter component 214-4, an I/Q component 218, a single A/D 220-4, and finally, in matrix form, a second set of "n" snapshot is derived from an output of a second combiner 222-4.

After gathering all "n" snapshots from the antenna arrays 104-2 and 104-4 to obtain "N" snapshots, the MLE in the presence of Gaussian additive noise is derived. That is, given N snapshots collected from each array, the following cost function is written as:

$$Q(p) = \sum_{l=1}^{L} \sum_{n=1}^{N} \|y_{l,n} - W_l a_l(p) \cdot \beta_l\|^2 \qquad \text{Eq. 2}$$

Where the following is defined:

$$\tilde{y}_l \triangleq \begin{bmatrix} y_{l,1} \\ y_{l,2} \\ \vdots \\ y_{l,N} \end{bmatrix}, \tilde{n}_l \triangleq \begin{bmatrix} n_{l,1} \\ n_{l,2} \\ \vdots \\ n_{l,N} \end{bmatrix} \quad \tilde{a}_l \triangleq 1_N \otimes (W_l a_l) \qquad \text{Eq. 3}$$

where $1_N$ is a N×1 vector of 1s.

Using Eq. 3, the cost function Q(p) may be further recast as:

$$Q(p, \beta_1, \cdots, \beta_L) = \sum_{l=1}^{L} \|\tilde{y}_l - \tilde{a}_l \cdot \beta_l\|^2 \qquad \text{Eq. 4}$$

Using the Kronecker operator properties, the least squares estimate of "$\beta_l$" is given by, $$\hat{\beta}_l = (\tilde{a}_l^H \tilde{a}_l)^{-1} \tilde{a}_l^H \tilde{y}_l \qquad \text{Eq. 5}$$
$$= ([1_N^T 1_N] \otimes [\tilde{a}_l^H W_l^H W_l \tilde{a}_l])^{-1} \tilde{a}_l^H \tilde{y}_l$$

Since the variable "$W_l$" is a Hadamard matrix, it is noted that $$W_l^H W_l = M \cdot 1 \qquad \text{Eq. 6}$$

Furthermore, $\|a_l\|^2 = 1$, therefore it is derived:

$$\hat{\beta}_l = \frac{1}{M \cdot N} \tilde{a}_l^H \tilde{y}_l \qquad \text{Eq. 7}$$

Furthermore still, it is denoted that $\pi \triangleq \bar{a}(a^H a)^{-1} a^H$ and after substituting Eq. (7) back into Eq. 2, it is derived:

$$Q(\theta) = \|\tilde{y} - \Pi \tilde{y}\|^2 \qquad \text{Eq. 8}$$
$$= (\tilde{y}^H - \tilde{y}^H \Pi)(\tilde{y} - \Pi \tilde{y})$$

$$= \tilde{y}^H \tilde{y} - \tilde{y}^H \Pi \tilde{y} - \tilde{y}^H \Pi \tilde{y} + \tilde{y}^H \Pi \tilde{y}$$
$$= \tilde{y}^H \tilde{y} - \tilde{y}^H \Pi \tilde{y}$$
$$= \tilde{y}^H \tilde{y} - \frac{1}{M \cdot N} \tilde{y}^H \tilde{a} \tilde{a}^H \tilde{y}$$

Since $\tilde{y}^H \tilde{y}$ is free of $\theta_l$ and $\varphi_l$, minimizing Eq. 8 is equivalent to maximizing the following cost function:

$$\tilde{Q}(\theta, \phi) = \tilde{y}^H \tilde{a} \tilde{a}^H \tilde{y} \qquad \text{Eq. 9}$$
$$= \sum_{n=1}^{N} y_n^H W a a^H W^H y_n$$
$$= \sum_{n=1}^{N} Tr\{a^H W^H y_n y_n^H W a\}$$
$$= Tr\left\{a^H W^H \sum_{n=1}^{N} y_n y_n^H W a\right\}$$
$$= a^H W^H \hat{R} W a$$

where $Tr\{\cdot\}$ denotes the matrix trace operator, and $\hat{R}$ is the sample covariance matrix given by:

$$\hat{R} = \frac{1}{N} \sum_{n=1}^{N} y_n y_n^H \qquad \text{Eq. 10}$$

As described herein, the MLE of $\theta$ and $\varphi$ may be stated as:

$$\hat{\theta}, \hat{\phi} = \underset{\theta, \phi}{\operatorname{argmax}} \{\bar{a}^H(\theta, \phi) \hat{R} \bar{a}(\theta, \phi)\} \qquad \text{Eq. 11}$$

where $\bar{a}(\theta, \varphi) \triangleq Wa$.

Furthermore, the maximization of Eq. 11 may be achieved via 2-dimensional grid search.

With regard to the MLE of p, the relationship between the angle (i.e., $\theta$ and $\varphi$) and position may be defined by Eq. 12 below.

$$\theta_l(p) = \arctan\left(\frac{y - \bar{y}_l}{x - \bar{x}_l}\right) \qquad \text{Eq. 12}$$
$$\phi_l(p) = \arctan\left(\frac{z - \bar{z}_l}{\sqrt{(x - \bar{x}_l)^2 + (y - \bar{y}_l)^2}}\right)$$

Referring back to Eq. (2) to Eq. (7) above, the following is denoted by $\pi_l \triangleq \bar{a}_l(\hat{a}_l^H a_l)^{-1} a_l^H$. As such, it is shown that $\Pi_l^H = \pi_l$ and $\pi_H \cdot \pi_l = \pi_l$.

After substituting Eq. 7 back to Eq. 2, the following is derived:

$$Q_l(p) = \|\tilde{y}_l - \Pi_l \tilde{y}_l\|^2 \qquad \text{Eq. 13}$$
$$= (\tilde{y}_l^H - \tilde{y}_l^H \Pi_l)(\tilde{y}_l - \Pi_l \tilde{y}_l)$$
$$= \tilde{y}_l^H \tilde{y}_l - \tilde{y}_l^H \Pi \tilde{y}_l - \tilde{y}_l^H \Pi_l \tilde{y}_l + \tilde{y}_l^H \Pi_l \tilde{y}_l$$

-continued $$= \tilde{y}^H \tilde{y} - \tilde{y}^H \Pi \tilde{y}$$

$$= \tilde{y}_l^H \tilde{y}_l - \frac{1}{M \cdot N} \tilde{y}_l^H \tilde{a}_l \tilde{a}_l^H \tilde{y}_l$$

Since $\bar{y}_l^H \bar{y}_l$ is independent of p, minimizing Eq. 13 is equivalent to maximizing the following cost function:

$$\tilde{Q}(p) = \sum_{l=1}^{L} \tilde{y}_l^H \tilde{a}_l \tilde{a}_l^H \tilde{y}_l \quad \text{Eq. 14}$$

$$= \sum_{l=1}^{L} \sum_{n=1}^{N} \bar{y}_{l,n}^H W_l a_l a_l^H W_l^H \bar{y}_{l,n}$$

$$= \sum_{l=1}^{L} \sum_{n=1}^{N} Tr\{a_l^H W_l^H \bar{y}_{l,n} y_{l,n}^H W_l a_l\}$$

$$= \sum_{l=1}^{L} Tr\left\{ a_l^H W_l^H \sum_{n=1}^{N} y_n y_{l,n}^H W_l a_l \right\}$$

$$= \sum_{l=1}^{L} a_l^H W_l^H \hat{R}_l W_l a_l$$

where Tr{·} denotes the matrix trace operator, and $\hat{R}$ is the sample covariance matrix given by:

$$\hat{R}_l = \frac{1}{N} \sum_{n=1}^{N} y_{l,n} y_{l,n}^H \quad \text{Eq. 15}$$

The MLE of p may be stated as:

$$\hat{p} = \underset{p}{\operatorname{argmax}} \left\{ \sum_{l=1}^{L} \bar{a}_l^H(\bar{p}) \hat{R}_l \bar{a}_l(\bar{p}) \right\} \quad \text{Eq. 16}$$

Where $a_l(p) \triangleq W_l a_l$. As opposed to the maximization of Eq. 11 above where a 2-dimensional grid search is utilized, the maximization of Eq. 16 may be achieved via 3-dimensional grid search over {x, y, z} coordinates range.

With continuing reference to FIG. 2, a position estimator component 224 may be configured to implement the mathematical algorithm as described above. The position estimator may be further implemented as a firmware, software, hardware, or a combination thereof. The mathematical algorithm may facilitate an output 226, which is the estimated actual position of the transmitting AP 110.

Figure 3:
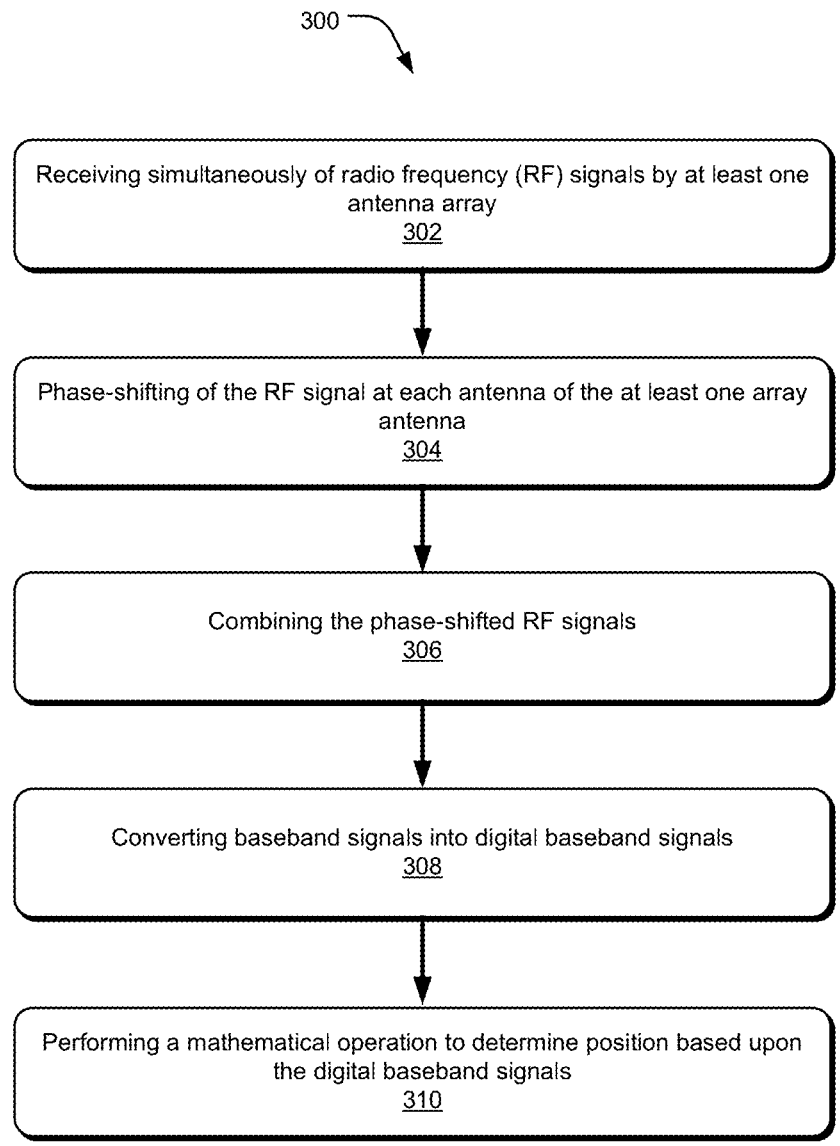
FIG. 3 is an example process chart illustrating an example method for implementing a direct estimation of a transmitter position by a portable device.

FIG. 3 shows an example process chart 300 illustrating an example method for a direct estimation of a transmitter position by a portable device. For example, the direct estimation may be based upon the received raw signals from the transmitter and with the use of mathematical operations that may not require an initial estimation of AOA, which is typically used as a basis for estimating the transmitter position. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 302, receiving RF signals by at least one antenna array is performed. For example, a portable device (e.g., portable device 102) detects and receives mm-wave wireless signals or RF signals through antenna arrays 104.

As described herein, the portable device 102 may include unsynchronized two or more antenna arrays 104 to receive the RF signals. For example, the unsynchronized two or more antenna arrays 104 may be connected to different LOs within the portable device 102. In this example, the estimation of transmitter position as described herein may utilize a single antenna array 104, or multiple antenna arrays 104.

At block 304, phase-shifting of the RF signal at each antenna of the at least one antenna array is performed. For example, a Hadamard matrix algorithm may facilitate the phase shift for each received RF signal on each antenna of the at least one antenna array 104. The phase shifts are of +π or −π (i.e., ±1) phase shifts and are taken from rows of a Hadamard matrix.

At block 306, combining the phase shifted RF signals is performed. For example, the first combiner component 212-2 may combine phase shifted RF signal from different antenna/elements of the antenna array 104-2. Thereafter, the combined phase shifted RF signals are transformed into baseband signals by converter component 214.

At block 308, converting baseband signals into digital signals is performed. For example, a single A/D for each antenna array 104 is utilized to perform analog to digital conversion of the baseband signal, which is derived from the combined phase shifted RF signal output of the first combiner component 212-2.

At block 310, performing a mathematical operation to estimate a transmitter position based upon the combined phase shifted RF signals. For example, given N snapshots that are collected from each antenna array 104, the cost function is derived to generate the estimated position of the transmitter.

The following examples pertain to further embodiments:

Example 1 is a method of estimating a transmitter position, the method comprising: receiving radio frequency (RF) signals by at least one antenna array; phase shifting the received RF signal at each element of the least one antenna array; combining the phase shifted RF signals and transforming the combined phase shifted RF signals into baseband signals; converting the baseband signals into digital baseband signals; and generating snapshots of the received digital baseband signals with a maximum likelihood estimation (MLE) operation to generate an estimated transmitter position.

In example 2, the method as recited in example 1, wherein the phase shifting of the received of the RF signals comprises generating phase shifts from a row of a Hadamard matrix.

In example 3, the method as recited in example 1, wherein the converting into digital baseband signals comprises using a single analog to digital (A/D) converter per antenna array.

In example 4, the method as recited in example 1, wherein the generating snapshots comprises generating separate snapshots per antenna array, and gathering the separate snapshots for all antenna arrays.

In example 5, the method as recited in example 1 further comprising filtering and amplifying the received RF signals prior to the phase shifting.

In example 6, the method as recited in example 1, wherein the converting into digital baseband signals comprises using different local oscillators per antenna array.

In example 7, the method as recited in example 6, wherein the antenna array is synchronized separate from any other antenna array.

In example 8, the method as recited in example 1, wherein the MLE is operation is based on a Gaussian additive noise.

In example 9, the method as recited in example any of examples 1 to 8, wherein the estimated position comprises an azimuth and an elevation of the transmitter position.

Example 10 is a device comprising: at least one antenna array configured to receive radio frequency (RF) signals; a phase-shifter component configured to each element of the at least one antenna array, the phase-shifter component is configured to shift phase of the received RF signal at each element of the least one antenna array; a first combiner component configured to combine the phase shifted RF signals; a converter component configured to transform the combined phase shifted RF signals into baseband signals; an analog to digital (A/D) converter component configured to convert the baseband signals into digital baseband signals; and a position estimator component configured to generate snapshots of the received digital baseband signals, with a maximum likelihood estimation (MLE) operation to generate an estimated transmitter position.

In example 11, the device as recited in example 10, wherein the phase-shifter component is configured to generate phase shifts from a row of a Hadamard matrix.

In example 12, the device as recited in example 10, wherein the converter component comprises a single analog to digital (A/D) converter per antenna array.

In example 13, the device as recited in example 10 further comprising a local oscillator configured to supply a down-converting signal to the converter component.

In example 14, the device as recited in example 13, wherein the antenna array is synchronized separate from any other antenna array.

In example 15, the device as recited in example any of examples 10 to 14, wherein the position estimator component is configured to calculate the MLE based on a Gaussian additive noise.

Example 16 is a receiver circuit comprising: at least one antenna array with multiple elements configured to receive radio frequency (RF) signals on each element; a phase-shifter component at each element of the at least one antenna array, the phase-shifter component configured to shift phase of the received RF signal at each element of the least one antenna array; a first combiner component configured to combine the phase shifted RF signals from each element of the at least one antenna array; a converter component configured to transform the combined phase shifted RF signals into baseband signals; an analog to digital (A/D) converter component configured to convert the baseband signals into digital baseband signals; and a position estimator component configured to perform a maximum likelihood estimation (MLE) operation on the received digital baseband signals to generate an estimated transmitter position.

In example 17, the receiver circuitry as recited in example 16, wherein the phase-shifter component is configured to generate phase shifts from a row of a Hadamard matrix.

In example 18, the receiver circuitry as recited in example 16 further comprising a local oscillator configured to supply a down-converting signal to the converter component.

In example 19, the receiver circuitry as recited in example 16 wherein the position estimator component is configured to calculate the MLE based on a Gaussian additive noise.

In example 20, the receiver circuitry as recited in example any of examples 16 to 19, wherein the converter component comprises a single analog to digital (A/D) converter per antenna array.

What is claimed is:

1. A method of estimating a transmitter position, the method comprising:
   receiving radio frequency (RF) signals by a plurality of antenna arrays, wherein each antenna array comprises multiple elements;
   phase shifting the received RF signal at each element of the antenna array of the plurality of antenna arrays;
   combining the phase shifted RF signals and transforming the combined phase shifted RF signals into baseband signals;
   converting the baseband signals into digital baseband signals;
   generating a model that includes a set of snapshots of the digital baseband signals for each antenna array in the plurality of antenna arrays;
   gathering the generated models for each antenna array in the plurality of antenna arrays;
   deriving maximum likelihood estimation (MLE) based on the gathered models; and
   generating an estimated transmitter position based on the derived MLE.

2. The method as recited in claim 1, wherein the phase shifting of the received of the RF signals comprises generating phase shifts from a row of a Hadamard matrix.

3. The method as recited in claim 1, wherein the converting into digital baseband signals comprises using a single analog to digital (A/D) converter per antenna array.

4. The method as recited in claim 1, wherein the generating snapshots comprises generating a separate set of snapshots per antenna array.

5. The method as recited in claim 1 further comprising filtering and amplifying the received RF signals prior to the phase shifting.

6. The method as recited in claim 1, wherein the converting into digital baseband signals comprises using different local oscillators per antenna array.

7. The method as recited in claim 6, wherein the antenna array is synchronized separate from any other antenna array.

8. The method as recited in claim 1, wherein the MLE operation is based on a Gaussian additive noise.

9. The method as recited in claim 1, wherein the estimated position comprises an azimuth and an elevation of the transmitter position.

10. A device comprising:
    a plurality of antenna arrays configured to receive radio frequency (RF) signals, wherein each antenna array comprises multiple elements;
    a phase-shifter component configured to each element of the antenna array, the phase-shifter component is configured to shift phase of the received RF signal at each element of the antenna array;
    a first combiner component configured to combine the phase shifted RF signals;
    a converter component configured to transform the combined phase shifted RF signals into baseband signals;
    an analog to digital (A/D) converter component configured to convert the baseband signals into digital baseband signals;
    a second combiner component configured to generated a model that includes a set of snapshots of the digital baseband signals for each antenna array in the plurality of antenna arrays;

a position estimator component configured to gather the generated models for each antenna array in the plurality of antenna arrays, the position estimator component performs a maximum likelihood estimation (MLE) operation on the gathered models of the plurality of antenna arrays to generate an estimated transmitter position.

11. The device as recited in claim 10, wherein the phase-shifter component is configured to generate phase shifts from a row of a Hadamard matrix.

12. The device as recited in claim 10, wherein the converter component comprises a single analog to digital (A/D) converter per antenna array.

13. The device as recited in claim 10 further comprising a local oscillator configured to supply a down-converting signal to the converter component.

14. The device as recited in claim 13, wherein the antenna array is synchronized separate from any other antenna array.

15. The device as recited in claim 10, wherein the position estimator component is configured to calculate the MLE based on a Gaussian additive noise.

16. A receiver circuit comprising:
 a plurality of antenna arrays with multiple elements on each antenna array and configured to receive radio frequency (RF) signals on each element;
 a phase-shifter component at each element of the antenna array, the phase-shifter component configured to shift phase of the received RF signal at each element of the antenna array;
 a first combiner component configured to combine the phase shifted RF signals from each element of the antenna array;
 a converter component configured to transform the combined phase shifted RF signals into baseband signals;
 an analog to digital (A/D) converter component configured to convert the baseband signals into digital baseband signals;
 a second combiner component configured to generate a model that includes a set of snapshots of the digital baseband signals for each antenna array in the plurality of antenna arrays;
 a position estimator component configured to gather the generated models for each antenna array in the plurality of antenna arrays, the position estimator component performs a maximum likelihood estimation (MLE) operation on the gathered generated models of the plurality of antenna arrays to generate an estimated transmitter position.

17. The receiver circuitry as recited in claim 16, wherein the phase-shifter component is configured to generate phase shifts from a row of a Hadamard matrix.

18. The receiver circuitry as recited in claim 16, wherein the converter component comprises a single analog to digital (A/D) converter per antenna array.

19. The receiver circuitry as recited in claim 16 further comprising a local oscillator configured to supply a down-converting signal to the converter component.

20. The receiver circuitry as recited in claim 16 wherein the position estimator component is configured to calculate the MLE based on a Gaussian additive noise.

\* \* \* \* \*